(12) United States Patent
Wu et al.

(10) Patent No.: US 9,208,535 B2
(45) Date of Patent: Dec. 8, 2015

(54) METHOD AND APPARATUS FOR GRAPHICAL PROCESSING UNIT (GPU) ACCELERATED LARGE-SCALE WEB COMMUNITY DETECTION

(71) Applicant: Xerox Corporation, Norwalk, CT (US)

(72) Inventors: Changjun Wu, Rochester, NY (US); Tong Sun, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 93 days.

(21) Appl. No.: 14/089,307

(22) Filed: Nov. 25, 2013

(65) Prior Publication Data
US 2015/0145866 A1    May 28, 2015

(51) Int. Cl.
*G06T 11/20* (2006.01)
*G06T 1/20* (2006.01)
*G09G 5/22* (2006.01)

(52) U.S. Cl.
CPC .................. *G06T 1/20* (2013.01); *G06T 11/203* (2013.01); *G06T 11/206* (2013.01); *G06T 11/20* (2013.01); *G06T 2210/32* (2013.01)

(58) Field of Classification Search
CPC ..... G06T 11/206; G06T 11/20; G06T 11/203; G06T 2200/24
USPC .................... 345/440, 441, 440.1, 440.2, 442
See application file for complete search history.

(56) References Cited

PUBLICATIONS

N. Melab, et al., "A GPU-accelerated Branch-and-Bound Algorithm for the Flow-Shop-Scheduling Problem", 2012 IEEE International Conf. on Cluster Computing, pp. 10-17, Sep. 24-28, 2012.*
Wu, C.-J., Kalyanaraman, A., "GPU Accelerated Protein Family Identification for Metagenomics", pp. 1-11. May 2013.
Gibson, D., et al., "Discovering Large Dense Subgraphs in Massive Graphs", *Proceedings of the 31st VLDB Conference*, 2005, pp. 721-732, Trondheim, Norway.
Yuan, X., et al., "Optimizing a Near-Duplicate Document Detection System with SIMD Technologies", *Journal of Computational Information Systems*, Nov. 2011, vol. 7, No. 11, consists of 8 unnumbered pages.
Huang, F., et al., "Fast Detection of Overlapping Communities via Online Tensor Methods on GPUs", retrieved on Sep. 3, 2013, pp. 1-28.

* cited by examiner

*Primary Examiner* — Jin-Cheng Wang

(57) ABSTRACT

A method, non-transitory computer readable medium, and apparatus for large-scale web community detection using a graphical processing unit (GPU) are disclosed. For example, the method receives an input graph formatted into one or more first adjacency lists from a central processing unit (CPU), performs a first level shingling on the one or more first adjacency lists, sends the first level shingling to the CPU to generate an aggregate graph based upon the first level shingling, receives the aggregate graph formatted into one or more second adjacency lists from the CPU, performs a second level shingling on the one or more second adjacency lists and sends the second level shingling to the CPU to generate a dense sub-graph that identifies one or more web communities.

20 Claims, 5 Drawing Sheets

METHOD AND APPARATUS FOR GRAPHICAL PROCESSING UNIT (GPU) ACCELERATED LARGE-SCALE WEB COMMUNITY DETECTION

The present disclosure relates generally to web community detection and, more particularly, to a method and apparatus for graphical processing unit (GPU) accelerated large-scale web community detection.

BACKGROUND

Web community detection system has been an active research area for decades. These detected web communities can help us to understand the structure of the underlying graph connection. These connections can then also guide product or service recommendations. Thus, valuable information may be obtained by identifying web communities from a large data set.

However, the large data set can include millions or billions of data points. Processing the data set can be computationally intensive and expensive using traditional methods.

There are a variety of algorithms designed to achieve this community detection task. However, the quick explosion of the web data render these existing algorithms impractical while analyzing a graph with millions of vertices and billions of edges. Brute force detection using only a CPU is an inefficient way for detecting the web communities.

SUMMARY

According to aspects illustrated herein, there are provided a method, a non-transitory computer readable medium, and an apparatus for large-scale web community detection using a graphical processing unit (GPU). One disclosed feature of the embodiments is a method that receives an input graph formatted into one or more first adjacency lists from a central processing unit (CPU), performs a first level shingling on the one or more first adjacency lists, sends the first level shingling to the CPU to generate an aggregate graph based upon the first level shingling, receives the aggregate graph formatted into one or more second adjacency lists from the CPU, performs a second level shingling on the one or more second adjacency lists and sends the second level shingling to the CPU to generate a dense sub-graph that identifies one or more web communities.

Another disclosed feature of the embodiments is a non-transitory computer-readable medium having stored thereon a plurality of instructions, the plurality of instructions including instructions which, when executed by a processor, cause the processor to perform an operation that receives an input graph formatted into one or more first adjacency lists from a central processing unit (CPU), performs a first level shingling on the one or more first adjacency lists, sends the first level shingling to the CPU to generate an aggregate graph based upon the first level shingling, receives the aggregate graph formatted into one or more second adjacency lists from the CPU, performs a second level shingling on the one or more second adjacency lists and sends the second level shingling to the CPU to generate a dense sub-graph that identifies one or more web communities.

Another disclosed feature of the embodiments is an apparatus comprising a processor and a computer readable medium storing a plurality of instructions which, when executed by the processor, cause the processor to perform an operation that receives an input graph formatted into one or more first adjacency lists from a central processing unit (CPU), performs a first level shingling on the one or more first adjacency lists, sends the first level shingling to the CPU to generate an aggregate graph based upon the first level shingling, receives the aggregate graph formatted into one or more second adjacency lists from the CPU, performs a second level shingling on the one or more second adjacency lists and sends the second level shingling to the CPU to generate a dense sub-graph that identifies one or more web communities.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for large-scale web community detection using a graphical processing unit (GPU). Web community detection system has been an active research area for decades. These detected web communities can help us to understand the structure of the underlying graph connection. These connections can then also guide product or service recommendations.

There are a variety of algorithms designed to achieve this community detection task. However, the quick explosion of the web data render these existing algorithms impractical while analyzing a graph with millions of vertices and billions of edges. Brute force detection using only a central processing unit (CPU) is an inefficient way for detecting the web communities.

Most computing systems having a graphical processing unit (GPU). In recent years, the processing power of GPUs has increased and become more sophisticated. Recently, general purpose GPUs (GPGPUs) have been developed that allow the GPGPU to handle general computation typically handled by the central processing unit (CPU) in addition to the graphic related processing.

One example of a GPGPU is produced by Nvidia® that uses Compute Unified Device Architecture (CUDA) that is a hardware and software platform to enable programmers to write general purposed programs on a GPU. The GPU application may contain a copy of a host code and a copy of a device code. The host code is executed on the CPU and the device code is executed on the GPU. The memory on the CPU side is referred to as a host memory and the device memory is used to refer to memory on the GPU side. The device memory on the GPU side may include shared memory, constant memory and global memory. Data may be copied from the host memory to the device memory and vice versa.

Figure 1:
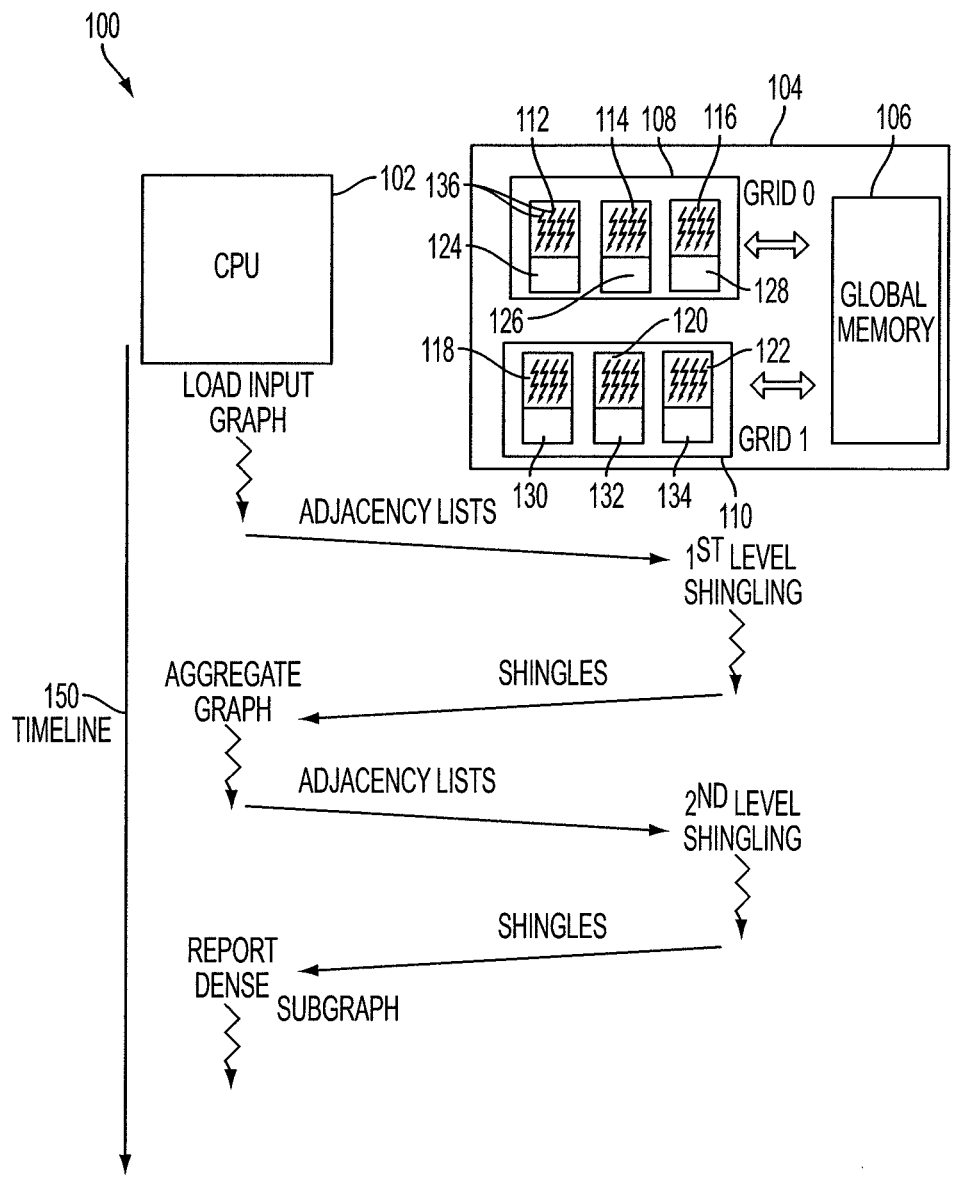
FIG. 1 illustrates example system for large-scale web community detection using a graphical processing unit (GPU)

In one embodiment, parallel functions for detecting large-scale web communities may be achieved through execution of kernel functions on individual GPU threads inside of thread blocks in the shared memory. FIG. 1 illustrates an example block diagram of a GPU 104 and a hierarchical memory space of the GPU 104.

In one embodiment, the GPU 104 may include a global memory 106. The global memory 106 may be in communication with one or more grids 108 and 110. Within each one of the grids 108 and 110 may be a thread block 112, 114, 116 of the gird 108 and thread blocks 118, 120 and 122 of the grid 110. Each one of the thread blocks 112-122 may include a shared memory space 124, 126, 128, 130, 132 and 134, respectively and one or more threads 136.

In one embodiment, each one of the thread blocks 112-122 may have its own local registers and per-thread local memory and it executes an instance of the kernel. A thread 136 inside of a thread block 112-122 may be identifiable through a thread ID. Thread blocks 112-122 may be scheduled independently and the inter-block communication may be achieved through synchronizations on the global memory 106. The size of the per-block shared memory 124-134 is much smaller than the size of the global memory 106, but the memory latency of the thread blocks 112-122 is roughly 100 times lower than the memory latency of the global memory 106.

FIG. 1 also illustrates an example system 100 including the GPU 104 and a central processing unit (CPU) 102. In one embodiment, the system 100 offloads some functions of the shingling to the GPU 104 as illustrated moving along a timeline 150. For example, the CPU 102 may load an input graph and format the input graph into adjacency lists that are processed by the GPU 104. In one embodiment, the input graph may be a graph or data set of a plurality of users and one or more connections or friends of each one of the plurality of users. The GPU 104 may perform the first level and second level shingling to create the aggregate graph and the dense sub-graph, respectively. The dense sub-graphs may illustrate and identify the web-communities. The specifics to each of these processes are described in further detail below.

Figure 2:
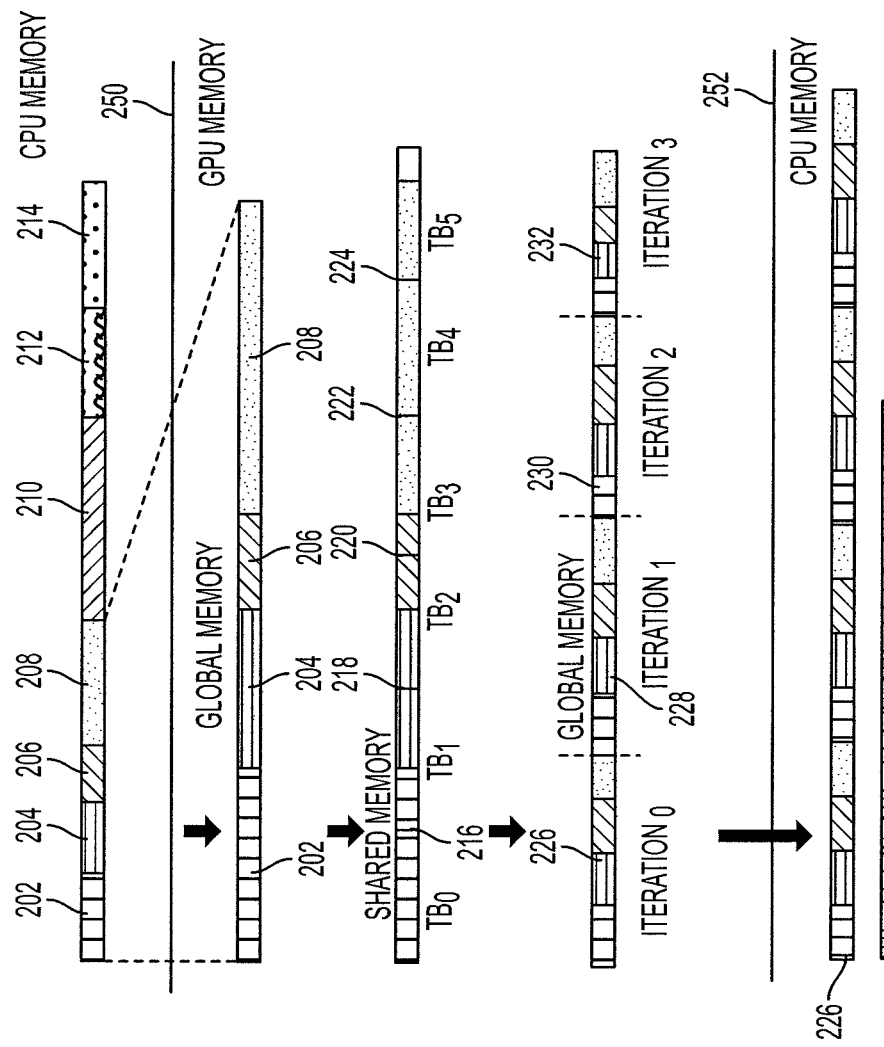
FIG. 2 illustrates an example of segmented sorting on the GPU.

FIG. 2 illustrates an example of segmented sorting that is performed to identify the shingles in the graphs provided to the CPU 102. In one embodiment, the input graph is loaded into the CPU 102. The CPU 102 may format the input graph into one or more first adjacency lists 202-214.

In one embodiment, given a set of user points $D=\{d_1, d_2, d_3, \ldots, d_n\}$ a web community may be found by partitioning D and finding the partitions that contain all the data elements which are similar to each other. For example, for D={a, b, c, d, e, f, g}, a data partition may split the data into {a, b, d}, {c, e, f} and {g}. All the data points a, b, d in the first partition are highly related to each other; however, they do not need to be fully connected.

In one embodiment, the given dataset D may be input into a graph G(V,E), where each vertex $v_i$ in V represents a data point in D and an edge $E(v_i, v_j)$ is put between $v_i$ and $v_j$ if data points $d_i$ and $d_j$ pass a predefined data similarity. The data similarity may be a predefined cutoff criterion. For each vertex $v_i$, $\Gamma(v_i)$ is used to denote the set of vertices which are adjacent to $v_i$.

In one embodiment, random hash functions may be applied to the vertices to identify the shingles. Let $H=\{h_1, h_2, \ldots, h_c\}$ denote a set of random hash functions that can be implemented through c random number pairs $\{<A_j, B_j>|j \in [1, c]\}$. Let $h_i(\Gamma(v_i))$ denote a random permutation of $\Gamma(v_i)$ through has function $h_i()$. A tuple $<v_m, s_i(v_m)>$ denotes a shingle $s_i(v_m)$ generated from $h_i(\Gamma(v_i))$. In one embodiment, the random permutations may be sorted using a sorting algorithm identify the shingles $s_i(v_m)$.

The one or more first adjacency lists 202-214 may be loaded into the global memory of the GPU 104 in one or more batches as illustrated crossing a line 250 from the memory space of the CPU 102 to the memory space of the GPU 104. As illustrated in FIG. 2, the adjacency lists 202, 204, 206 and 208 may be fed to the global memory. The global memory may then segment the batch into thread blocks (e.g., thread blocks 112, 114 and 116) of a grid (e.g., grid 108). The thread blocks may have a fixed memory size. Thus, if some of the adjacency lists do not fit in a single thread block, the adjacency list may be split into multiple thread blocks.

In one embodiment, a data structure may be created that marks each boundary between the adjacency lists and stored in the shared memory space (e.g. shared memory 124, 126 and 128). In one embodiment, the boundaries may simply be the delimiter placed between each adjacency list in the one or more adjacency lists in the CPU that is concatenated together. The data structure may be provided to the CPU 102 to recombine and merge the adjacency lists properly.

After the one or more first adjacency lists 202-214 are segmented into the thread blocks $TB_0$ to $TB_5$, the random hash functions may be applied to the segmented one or more first adjacency lists 202-214. The hash functions may then generate one or more random permutations of the one or more first adjacency lists 202-214 over multiple iterations.

Figure 3:
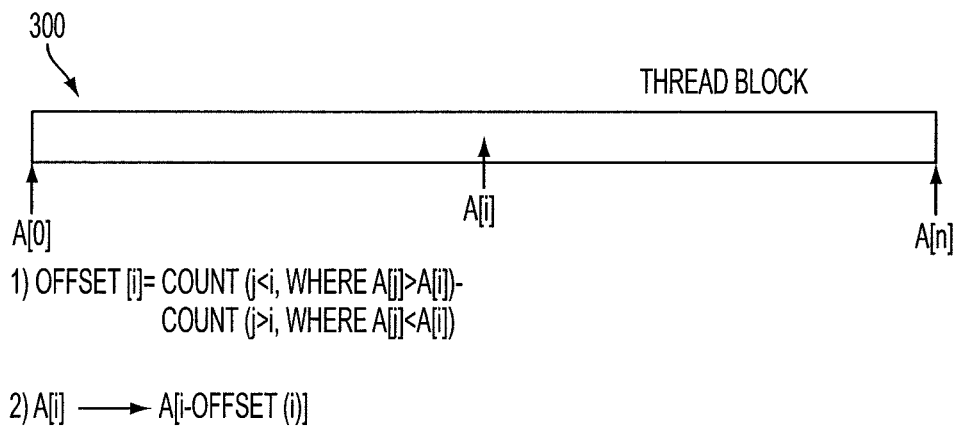
FIG. 3 illustrates an example of a parallel counting sort for segmented adjacency lists on a thread block.

The random permutations may then be sorted using any sorting algorithm. In one embodiment, a parallel counting sort may be used for the random permutations generated by the applied hash functions on the one or more first adjacency lists 202-214. FIG. 3 illustrates an example parallel counting sort algorithm. A thread block 300 may have a fixed size of n. The positions within the thread block 300 may range from A[0] to A[n]. The position of an index position i may be given by the equation A[i]=A[I−offset(i)] illustrated in FIG. 3. The offset may be given by the equation offset[i]=count (j<I, where A[j]>A[i])−count (j>I, where A[j]<A[i]). In one embodiment, the expression count (j<I, where A[j]>A[i]) may be considered a left side counter and the expression count (j>I, where A[j]<A[i]) may be considered a right side counter. The offset may be based upon a difference of the left side counter and the right side counter. The random permutations may then be sorted as illustrated by the segments 226, 228, 230 and 232 in FIG. 2. The shingles may then be selected from the sorted segments 226, 228, 230 and 232.

The above described method may be used to identify one or more shingles. In one embodiment, the process may be repeated for all the batches of adjacency lists remaining in the CPU memory that have not been processed (e.g., the adjacency lists 210, 212 and 214).

The sorted segments 226, 228, 230 and 232 having the identified shingles may be then sent from the memory space of the GPU 104 to the memory space of the CPU 102 as illustrated by a line 252. The CPU 102 may then use the data points obtained from the first level shingling to generate an aggregate graph. For example, the shingles may identify data points (e.g., connections or friends) that are part of the same graph. In one embodiment, the CPU 102 may perform the analysis and comparison of the shingles to generate the aggregate graph.

The aggregate graph may then be formatted into one or more second adjacency lists using the above method to identify one or more shingles. The second level shingling may then be used to create a dense sub-graph. Using the dense sub-graph, each vertex inside the same group is expected to be well connected to other members in the same group, thus, identifying the web communities.

In one embodiment, Algorithm 1 may be applied to one or more adjacency lists when the adjacency lists do not need to split over multiple thread blocks.

---
Algorithm 1 Shingling_on_GPU (D, s, c)
---
1. DM stands for the device memory
2. H = $\{h_1, h_2..., h_c\}$: a set of random hash functions
3. $M_D$: a memory space on the DM
4. $M'_D$: a memory space on the DM
5. $R_D$: a memory space to store shingles
6. R ← ∅
7. $M_D$ ← $\{\Gamma(v_1), \Gamma(v_2)...\}$
8. for i ← 1, c do
9.   // can be achieved through thrust::transform( )
10.   for all $d_p \in M_D$ do
11.     $M'_D[p]$ ← $h_i(d_p)$
12.   end for
13.   // can be achieved through thrust::sort( )
14.   Segmented sorting on $M'_D$
15.   for j ← 1, m do
16.     $R_D$ ← top s elements in $h_i(\Gamma(v_j))$
17.   end for
18. end for
---

In one embodiment, Algorithm 2 may be applied to one or more adjacency lists when any one of the adjacency lists are split over multiple thread blocks.

---
Algorithm 2 GPU accelerated shingling algorithm
---
1. HM stands for the host memory
2. DM stands for the device memory
3. $b_i$: a batch of adjacency list
4. $graph_H = \{b_1, b_2,...,b_k\}$: partitioned input graph on HM
5. $sglGraph_H = \{sb_1, sb_2...,sb_k\}$: partitioned input graph on HM
6. $sgls_D$: a memory space on DM
7. $sgls_H$: a memory space on HM
8. // CPU initiate the task by loading graph into HM
9. $graph_H$ ← CPU loads from disk I/O
10. while $graph_H \neq \emptyset$ do
11.   DM ← $b_i$
12.   $sgls_D$ ← Shingling_on_GPU (DM, $s_1$, $c_1$)
13.   $sgls_H$ ← $sgls_D$
14. end while
15. // data aggregation on CPU
16. $sglGraph_H$ ← CPU aggregates $sgls_H$ into a graph.
17. while $sglGraph_H \neq \emptyset$ do
18.   DM ← $sb_i$
19.   $sgls_D$ ← Shingling_on_GPU (DM, $s_2$, $c_2$)
20.   $sgls_H$ ← $sgls_D$
21. end while
22. // final data aggregation on CPU
23. CPU reports dense subgraphs from $sgls_H$
---

Figure 4:
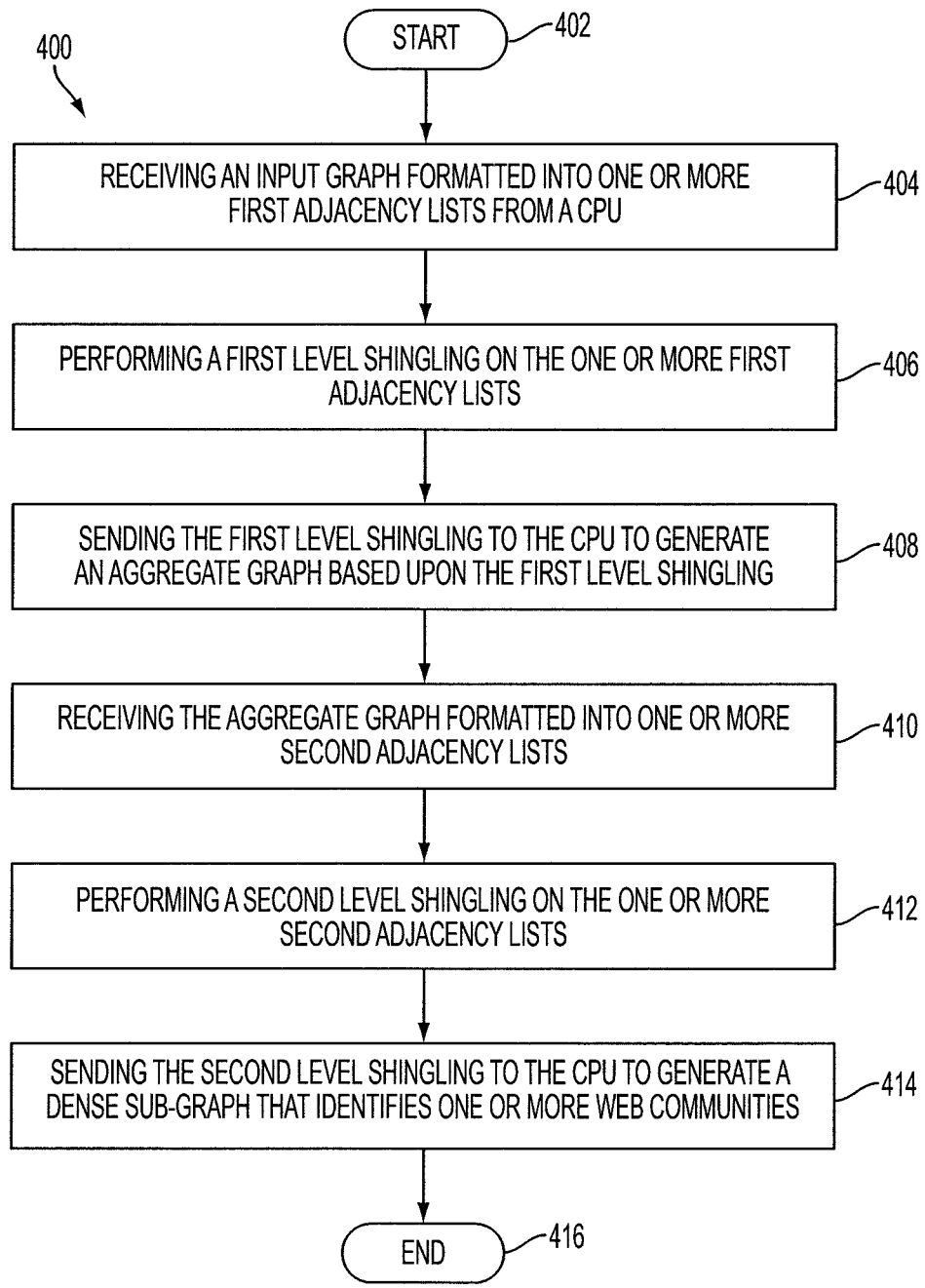
FIG. 4 illustrates an example flow chart of a method for large-scale web community detection using a graphical processing unit (GPU)

FIG. 4 illustrates a flowchart of a method 400 for large-scale web community detection using a graphical processing unit (GPU). In one embodiment, one or more steps or operations of the method 400 may be performed by the GPU or a general purpose computer 500 having a GPU illustrated in FIG. 5.

The method 400 begins at step 402. At step 404, the method 400 receives an input graph formatted into one or more first adjacency lists from a CPU. In one embodiment, the one or more first adjacency lists may be sent to the GPU in batches and loaded into a continuous memory space of the global memory of the GPU.

At step 406, the method 400 performs a first level shingling on the one or more first adjacency lists. In one embodiment, the first level shingling may include performing a random hash operation to generate a random permutation of the one or more first adjacency lists and performing a segmented sorting operation to reorganize each segment of the random permutation of the one or more first adjacency lists that is generated.

The details of the random hash operations are discussed above. In general, the random hash operations include applying a different hash function for each iteration of the random hash operations. The random permutations generated by the random hash operations may then be sorted using a segmented sort algorithm such as the parallel counting sort algorithm described above and illustrated in FIG. 3.

In one embodiment, the parallel nature of the thread blocks within the GPU may be used to provide faster processing of the one or more first adjacency lists. In one embodiment, the thread blocks may each have a fixed memory size. As a result, if one of the one or more first adjacency lists is larger than the fixed memory size of the thread blocks the adjacency list may be split into multiple thread blocks. The GPU may create a data structure stored in the shared memory of the GPU to mark each boundary between the one or more first adjacency lists such that the CPU may use the data structure to merge the segmented thread blocks after the GPU performs the first level shingling.

At step 408, the method 400 sends the first level shingling to the CPU to generate an aggregate graph based upon the first level shingling. However, to ensure that the shingles are accurate and verify the web communities found based upon the aggregate graph, a second level shingling may be performed to generate a dense sub-graph. In one embodiment, the CPU may format the aggregate graph into one or more second adjacency lists to send to the GPU.

At step 410, the method 400 receives the aggregate graph formatted into one or more second adjacency lists from the CPU. In one embodiment, the one or more second adjacency lists may be sent to the GPU in batches and loaded into a continuous memory space of the global memory of the GPU.

At step 412, the method 400 performs a second level shingling on the one or more second adjacency lists. The second level shingling may be performed using the methods and processes described in step 406 of method 400. For example, the second level shingling may also include performing a random hash operation to generate a random permutation of the one or more second adjacency lists and performing a segmented sorting operation to reorganize each segment of the random permutation of the one or more second adjacency lists that is generated.

The details of the random hash operations are discussed above. In general, the random hash operations include applying a different hash function for each iteration of the random hash operations. The random permutations generated by the random hash operations may then be sorted using a segmented sort algorithm such as the parallel counting sort algorithm described above and illustrated in FIG. 3.

At step 414, the method 400 sends the second level shingling to the CPU to generate a dense sub-graph that identifies one or more web communities. For example, in the dense sub-graph, each vertex inside the same group is expected to be well connected to other members in the same group, thus, identifying the web communities.

In one embodiment, the method 400 may continue to perform additional levels of shingling based upon a user preference. For example, the graphs may eventually converge with each additional shingling step performed to identify the web communities. The method 400 ends at step 416.

It should be noted that although not explicitly specified, one or more steps, functions, or operations of the method 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 4 that recite a determining operation, or involve a decision, do not necessarily require that both branches of the determining operation be practiced. In other words, one of the branches of the determining operation can be deemed as an optional step.

Figure 5:
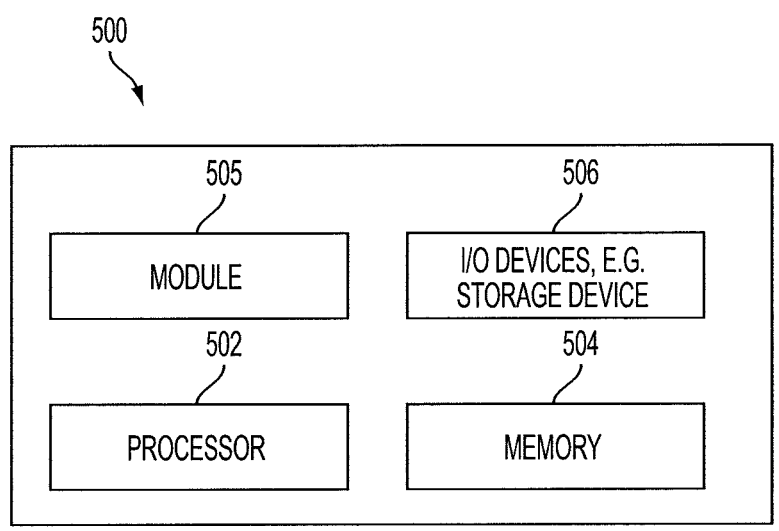
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for large-scale web community detection using a graphical processing unit (GPU), and various input/output devices 506 (e.g., storage devices, including but not limited to, a tape drive, a floppy drive, a hard disk drive or a compact disk drive, a receiver, a transmitter, a speaker, a display, a speech synthesizer, an output device (such as a graphic display, printer, and the like), an output port, and a user input device (such as a keyboard, a keypad, a mouse, and the like)). In one embodiment, the module 505 may be a GPU having a memory structure described in FIG. 1.

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 505 for large-scale web community detection using a graphical processing unit (GPU) can be loaded into memory 504 and executed by processor 502 to implement the functions as discussed above. As such, the present method 505 for large-scale web community detection using a graphical processing unit (GPU) (including associated data structures) of the present disclosure can be stored on a non-transitory (e.g., physical and tangible) computer readable storage medium, e.g., RAM memory, magnetic or optical drive or diskette and the like. For example, the hardware processor 502 can be programmed or configured with instructions (e.g., computer readable instructions) to perform the steps, functions, or operations of method 400.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for large-scale web community detection using a graphical processing unit (GPU), comprising:
   receiving, by the GPU, an input graph formatted into one or more first adjacency lists from a central processing unit (CPU);
   performing, by the GPU, a first level shingling on the one or more first adjacency lists;
   sending, by the GPU, the first level shingling to the CPU to generate an aggregate graph based upon the first level shingling;
   receiving, by the GPU, the aggregate graph formatted into one or more second adjacency lists from the CPU;
   performing, by the GPU, a second level shingling on the one or more second adjacency lists; and
   sending, by the GPU, the second level shingling to the CPU to generate a dense sub-graph that identifies one or more web communities.

2. The method of claim 1, wherein the receiving the input graph formatted into one or more first adjacency lists comprises:
   loading the one or more first adjacency lists into a continuous memory space of a global memory of the GPU; and
   creating a data structure on the GPU to mark each boundary between the one or more first adjacency lists, wherein the data structure is used by the CPU to merge the one or more first adjacency lists that are split during the performing of the first level shingling.

3. The method of claim 1, wherein the performing the first level shingling comprises:
   performing a random hash operation to generate a random permutation of the one or more first adjacency lists; and
   performing a segmented sorting operation to reorganize each segment of the random permutation of the one or more first adjacency lists that is generated.

4. The method of claim 3, wherein the performing the random hash operation comprises repeating the random hash operation with a different hash function for each iteration.

5. The method of claim 3, wherein the performing the segmented sorting operation comprises:
   processing in parallel the each segment of the random permutation of the one or more first adjacency lists in a thread block of a plurality of thread blocks of a shared memory of the GPU, wherein each one of the plurality of thread blocks comprises a fixed size.

6. The method of claim 5, wherein a segment of the random permutation of the one or more first adjacency lists is split into multiple thread blocks when the segment is larger than the fixed size of the thread block.

7. The method of claim 5, wherein the processing the each segment comprises:
   performing a segmented sorting operation on the each segment.

8. The method of claim 7, wherein the segmented sorting operation comprises a parallel counting sort.

9. The method of claim 8, wherein the parallel counting sort comprises:
   calculating a left side counter by counting a number of elements that need to be moved to a left side;
   calculating a right side counter by counting a number of elements that need to be moved to a right side; and
   determining a position of an element based upon a difference of the left side counter and the right side counter.

10. A non-transitory computer-readable medium storing a plurality of instructions which, when executed by a graphical processing unit (GPU), cause the GPU to perform operations for large-scale web community detection, the operations comprising:
    receiving an input graph formatted into one or more first adjacency lists from a central processing unit (CPU);
    performing a first level shingling on the one or more first adjacency lists;
    sending the first level shingling to the CPU to generate an aggregate graph based upon the first level shingling;

receiving the aggregate graph formatted into one or more second adjacency lists from the CPU;

performing a second level shingling on the one or more second adjacency lists; and sending the second level shingling to the CPU to generate a dense sub-graph that identifies one or more web communities.

11. The non-transitory computer-readable medium of claim 10, wherein the receiving the input graph formatted into one or more first adjacency lists comprises:

loading the one or more first adjacency lists into a continuous memory space of a global memory of the GPU; and creating a data structure on the GPU to mark each boundary between the one or more first adjacency lists, wherein the data structure is used by the CPU to merge the one or more first adjacency lists that are split during the performing of the first level shingling.

12. The non-transitory computer-readable medium of claim 10, wherein the performing the first level shingling comprises:

performing a random hash operation to generate a random permutation of the one or more first adjacency lists; and performing a segmented sorting operation to reorganize each segment of the random permutation of the one or more first adjacency lists that is generated.

13. The non-transitory computer-readable medium of claim 12, wherein the performing the random hash operation comprises repeating the random hash operation with a different hash function for each iteration.

14. The non-transitory computer-readable medium of claim 12, wherein the performing the segmented sorting operation comprises:

processing in parallel the each segment of the random permutation of the one or more first adjacency lists in a thread block of a plurality of thread blocks of a shared memory of the GPU, wherein each one of the plurality of thread blocks comprises a fixed size.

15. The non-transitory computer-readable medium of claim 14, wherein a segment of the random permutation of the one or more first adjacency lists is split into multiple thread blocks when the segment is larger than the fixed size of the thread block.

16. The non-transitory computer-readable medium of claim 14, wherein the processing the each segment comprises:

performing a segmented sorting operation on the each segment.

17. The non-transitory computer-readable medium of claim 16, wherein the segmented sorting operation comprises a parallel counting sort.

18. The non-transitory computer-readable medium of claim 17, wherein the parallel counting sort comprises:

calculating a left side counter by counting a number of elements that need to be moved to a left side;

calculating a right side counter by counting a number of elements that need to be moved to a right side; and determining a position of an element based upon a difference of the left side counter and the right side counter.

19. A method for large-scale web community detection using a graphical processing unit (GPU), comprising:

receiving, by the GPU, in a global memory of the GPU an input graph formatted into one or more first adjacency lists from a central processing unit (CPU), wherein one or more boundaries between the one or more first adjacency lists are marked;

performing, by the GPU, a first level shingling on the one or more first adjacency lists comprising a first plurality of random hash operations to generate a first plurality of different random permutations of the one or more first adjacency lists, wherein each one of the first plurality of random hash operations applies a different hash function and performing a first segmented sorting operation on each one of the first plurality of different random permutations using each one of a plurality of threads in a shared memory of the GPU in parallel;

sending, by the GPU, the first level shingling to the CPU to generate an aggregate graph based upon the first level shingling;

receiving, by the GPU, the aggregate graph formatted into one or more second adjacency lists from the CPU, wherein one or more boundaries between the one or more second adjacency lists are marked;

performing, by the GPU, a second level shingling on the one or more second adjacency lists comprising a second plurality of random hash operations to generate a second plurality of different random permutations of the one or more second adjacency lists, wherein each one of the second plurality of random hash operations applies a different hash function and performing a second segmented sorting operation on each one of the second plurality of different random permutations using each one of a plurality of threads in a shared memory of the GPU in parallel; and sending, by the GPU, the second level shingling to the CPU to generate a dense sub-graph that identifies one or more web communities.

20. The method of claim 19, wherein one or more segments of the first plurality of different random permutations or the second plurality of different random permutations are split into multiple thread blocks when the one or more segments are larger than a fixed size of a thread block.

* * * * *